United States Patent Office 2,942,026
Patented June 21, 1960

2,942,026

SATURATED AND UNSATURATED BICYCLIC CARBON-BRIDGED CARBONYLUREAS

Werner R. Boehme, Somerville, and Joseph Nichols, Princeton, N.J., assignors to Ethicon, Inc., a corporation of New Jersey No Drawing. Filed May 2, 1958, Ser. No. 732,428

6 Claims. (Cl. 260—553)

The present invention relates to new pharmaceutically effective saturated and unsaturated bicyclic carbon-bridged carbonylureas which have especially advantageous use as anticonvulsants and hypnotics and to pharmacologically effective formulations for oral administration which contain the saturated and unsaturated bicyclic carbonylureas. The new bicyclic carbon-bridged carbonylureas of this invention are represented by the following planar structural formula:

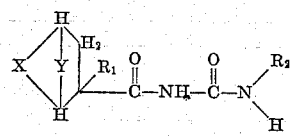

in which X is an ethylene or vinylene radical, Y is a methylene or ethylene radical, $R_1$ is hydrogen or a straight or branched-chain lower alkyl radical and preferably an alkyl radical having not more than six carbon atoms, and $R_2$ is hydrogen, a straight or branched-chain lower alkyl radical, preferably having not more than six carbon atoms, an acetyl or carboxamide radical.

By the term "bicyclic carbon-bridged carbonylureas," as used herein, is meant a cycloalkyl or cycloalkenyl ring bridged by methylene or ethylene.

The following structural formula shows the spatial relationships of the exo and endo positions of substituent groups on a bicycloheptane nucleus. Exo and endo positions of substituent groups have a corresponding spatial relationship on bicycloheptene and bicyclooctene nuclei.

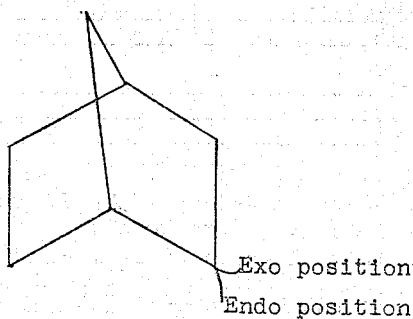

The new bicyclic carbon-bridged carbonylureas and the new formulations of the present invention are pharmaceutically effective and have especially advantageous utility as anticonvulsants when employed in the treatment of epileptiform disorders and also have utility as hypnotics. Among the compounds of the invention having outstanding utility are the following:

Bicyclo-(2,2,1)-5-heptene-2-endocarbonylurea
2-methylbicyclo-(2,2,2)-5-octene-2-carbonylurea
2-endomethylbicyclo-(2,2,1)-5-heptene - 2 - exocarbonylurea
1-acetyl-3-[2-endomethylbicyclo-(2,2,1)-5 - heptene - 2 - exocarbonyl]-urea
1-methyl-3-[2-endomethylbicyclo-(2,2,1)-5 - heptene - 2-exocarbonyl]-urea
Bicyclo-(2,2,2)-5-octene-2-carbonylurea
1-methyl-3-[2-endomethylbicyclo - (2,2,1) - heptane - 2-exocarbonyl]-urea
1-[2-endomethylbicyclo-(2,2,1)-5-heptene-2 - exocarbonyl]-biuret The novel unsaturated bicyclic carbon-bridged carbonylureas of this invention may generally be prepared by condensing a bicyclic acid chloride with urea or a substituted urea in the presence of an inert solvent such as benzene; other methods of preparation include reacting a methyl ester of a bicyclic carboxylic acid with sodio-urea or substituted urea, or reacting a bicyclic carbon-bridged acylisocyanate with ammonia, methyl amine, or acetamide. The bicyclic carbon-bridged acids which constitute the starting materials for the preparation of the novel compounds of this invention may be prepared by a reaction of cyclopentadiene or cyclohexadiene with acrylic acid or an alpha-substituted acrylic acid according to the method described by Diels and Alder, Ann., volume 460, page 98 (1928), and by Petrov and Sopov, Journal of General Chemistry (U.S.S.R.), volume 18, page 1781 (1948).

Saturated compounds corresponding to the unsaturated bicyclic carbon-bridged carbonylureas may be made by catalytic hydrogenation of the unsaturated compounds by the use of a palladium oxide catalyst, ethanol being the solvent.

Examples I and II illustrate the preparation of bicyclic carbon-bridged carbonylureas by a condensation of the corresponding acid chloride with urea. In general, the acid chloride and urea are fused together or suspended in benzene and refluxed, cooled, stirred with water and made alkaline with a mild alkali and then filtered. The insoluble material is the desired bicyclic carbonylurea and is purified by recrystallization from an appropriate solvent.

EXAMPLE I

*Bicyclo-(2,2,1)-5-heptene-2-endocarbonylurea*

A mixture of 32.5 grams of bicyclo-(2,2,1)-5-heptene-2-endocarbonyl chloride, which was prepared by the method of Parham, Hunter and Hanson, Journal of the American Chemical Society, volume 73, page 5068 (1951), 13.8 grams of urea and 150 grams of dry benzene was refluxed with stirring for six hours. The cooled suspension was stirred with 100 cc. of water, made slightly alkaline with aqueous potassium carbonate solution and filtered. The colorless solid so obtained was washed successively with benzene and water. The crude solid was purified by recrystallization from ethyl acetate and then melted at 202–203° C. with decomposition.

Calculated for $C_9H_{12}N_2O_2$:                      Percent
    Carbon _____ 59.98
    Hydrogen _____ 6.71
    Nitrogen _____ 15.55
Found:
    Carbon _____ 60.16
    Hydrogen _____ 6.86
    Nitrogen _____ 15.30

EXAMPLE II

*2-methylbicyclo-(2,2,2)-5-octene-2-carbonylurea*

A mixture of 209 grams of ethyl methacrylate, 146 grams of 1,3-cyclohexadiene and 18 grams of hydroquinone was heated in an autoclave for 22 hours at 130° C. The resulting ethyl 2-methylbicyclo-(2,2,2)-5-octene-2-carboxylate was distilled and had a boiling point of 122–123° C. at a pressure of 27 mm. Twenty-seven grams of the ester were saponified by refluxing for one-half hour with a solution of twelve grams of potassium hydroxide in 9 cc. of water and 60 grams of ethanol. The solution was acidified with dilute hydrochloric acid, the precipitated oil was removed by extraction with ether and the solvent was evaporated. A solution of nineteen grams of the resulting crude 2-methylbicyclo-(2,2,2)-5-octene-2-carboxylic acid in solution in 350 grams of chloroform and twenty grams of thionyl chloride was refluxed for five hours and distilled under reduced pressure.

The 2-methylbicyclo-(2,2,2)-5-octene-2-carbonyl chloride, which was obtained by distillation, had a boiling point of 130–132° C. at 30 mm. pressure. Fourteen grams of the carbonyl chloride and twenty grams of urea were heated for one hour at 150° C. Fifty grams of benzene were added to the cooled reaction mixture and the suspension was refluxed for four hours. The solvent was removed by distillation under reduced pressure and 2-methylbicyclo-(2,2,2)-5-octene-2-carbonyl-urea having a melting point of 197–199° C. was obtained by recrystallization of the residue from ethyl acetate and then from ether.

Calculated for $C_{11}H_{16}N_2O_2$:  Percent
  Carbon _____ 63.44
  Hydrogen _____ 7.74
  Nitrogen _____ 13.45
Found:
  Carbon _____ 63.43
  Hydrogen _____ 7.55
  Nitrogen _____ 13.25

Example III illustrates the preparation of a bicyclic carbonylurea in which the corresponding bicyclic acid chloride was added to a suspension of sodio-urea in toluene.

EXAMPLE III

Bicyclo-(2,2,2)-5-octene-2-carbonylurea

A mixture of 32.4 grams of ethyl acrylate, 25 grams of 1,3-cyclohexadiene and 2 grams of hydroquinone was heated in a sealed tube at 160° C. for 24 hours. The tube contents were distilled under reduced pressure and ethyl bicyclo-(2,2,2)-5-octene-2-carboxylate, having a boiling point of 105–107° C. at a pressure of 16–17 mm., was obtained.

Sodio-urea was prepared by adding 2.5 grams of sodium to a solution of 6.1 grams of urea in 175 grams of anhydrous liquid ammonia. Eighteen grams of ethyl bicyclo-(2,2,2)-5-octene-2-carboxylate were added to the solution of sodio-urea and the ammonia was allowed to evaporate. The residue was triturated with ice-water, acidified with dilute hydrochloric acid, and the solid was then separated by filtration. Pure bicyclo-(2,2,2)-5-octene-2-carbonylurea was obtained by recrystallization of the solid successively from ethanol and ethyl acetate. The recrystallized product had a melting point of 207–208° C.

Calculated for $C_{10}H_{14}N_2O_2$:  Percent
  Carbon _____ 61.83
  Hydrogen _____ 7.27
  Nitrogen _____ 14.42
Found:
  Carbon _____ 61.98
  Hydrogen _____ 7.23
  Nitrogen _____ 14.71

Examples IV, V, VI and VII illustrate the preparation of bicyclic carbon-bridged carbonylureas and a bicyclic carbon-bridged carbonylacylurea by a reaction of the corresponding bicyclic carbon-bridged acid chloride in ether solution with silver cyanate to provide a bicyclic carbon-bridged carbonylisocyanate and a reaction of the isocyanate with ammonia, methylamine or acetamide.

EXAMPLE IV

2-endomethylbicyclo-(2,2,1)-5-heptene-2-exocarbonylurea

A solution of 15.4 grams of 2-endomethylbicyclo-(2,2,1)-5-heptene-2-exocarbonyl chloride, which was prepared by the method of Petrov and Sopov, Journal of General Chemistry (U.S.S.R.), volume 18, page 1781 (1948), and Beckmann et al., Berichte, 87, 997 et seq. (1954), in fifty grams of anhydrous ether was added dropwise with stirring to a suspension of 14.1 grams of silver cyanate in 25 grams of anhydrous ether. The mixture was refluxed for four hours, the solid was removed by filtration and the filtrates were fractionally distilled under reduced pressure. 14.2 grams of 2-endomethylbicyclo-(2,2,1)-5-heptene-2-exocarbonylisocyanate having a boiling point of 106–109° C. at a pressure of 30 mm. were obtained and were dissolved in 125 grams of anhydrous ether, treated with a gentle stream of ammonia during two hours and allowed to stand overnight in a stoppered flask. The solvent was removed from the suspension by evaporation on a steam bath. The solid residue, which was crude 2-endomethylbicyclo-(2,2,1)-5-heptene-2-exocarbonylurea, was purified by recrystallization from methanol and the recrystallized material had a melting point of 148.5–149.5° C.

Calculated for $C_{10}H_{14}N_2O_2$:  Percent
  Carbon _____ 61.83
  Hydrogen _____ 7.27
  Nitrogen _____ 14.42
Found:
  Carbon _____ 62.07
  Hydrogen _____ 7.32
  Nitrogen _____ 14.32

EXAMPLE V

1-methyl-3-[2-endomethylbicyclo-(2,2,1)-5-heptene-2-exocarbonyl]-urea

A solution of 43 grams of 2-endomethylbicyclo-(2,2,1)-5-heptene-2-exocarbonylisocyanate, which had been prepared according to the method of Example IV, and 8.3 grams of anhydrous methylamine in solution in 450 grams of toluene was warmed to 35° C. and allowed to stand for five days. The solvent was removed by distillation under reduced pressure and the residue was recrystallized from hexane. The recrystallized product had a melting point of 136–137° C.

Calculated for $C_{11}H_{16}N_2O_2$:  Percent
  Carbon _____ 63.44
  Hydrogen _____ 7.74
  Nitrogen _____ 13.45
Found:
  Carbon _____ 63.54
  Hydrogen _____ 7.75
  Nitrogen _____ 13.53

EXAMPLE VI

1-acetyl-3-[2-endomethylbicyclo-(2,2,1)-5-heptene-2-exocarbonyl]-urea

A solution of 43 grams of 2-endomethylbicyclo-(2,2,1)-5-heptene-2-exocarbonylisocyanate, which had been prepared according to the method of Example IV, and 14.3 grams of acetamide in solution in 450 grams of dry toluene was refluxed for six hours and then cooled in an ice-bath. The precipitate which formed was removed by filtration and recrystallized from alcohol and then from water. The recrystallized product had a melting point of 161–162° C.

Calculated for $C_{12}H_{16}N_2O_3$:  Percent
  Carbon _____ 61.00
  Hydrogen _____ 6.83
  Nitrogen _____ 11.86
Found:
  Carbon _____ 61.22
  Hydrogen _____ 6.91
  Nitrogen _____ 11.75

EXAMPLE VII

1-[2-endomethylbicyclo-(2,2,1)-5-heptene-2-exocarbonyl]-biuret

A suspension of 43 grams of 2-endomethylbicyclo-(2,2,1)-5-heptene-2-exocarbonylisocyanate and 14.6 grams of urea in 300 grams of absolute ether was refluxed with stirring for six hours and allowed to stand overnight. The solid which formed was removed by filtration and recrystallized from an aqueous alcohol solution. The recrystallized product had a melting point of 199–200° C.

Calculated for $C_{11}H_{15}N_3O_3$:

| | Percent |
|---|---|
| Carbon | 55.68 |
| Hydrogen | 6.37 |
| Nitrogen | 17.71 |

Found:

| | |
|---|---|
| Carbon | 55.62 |
| Hydrogen | 6.21 |
| Nitrogen | 17.55 |

EXAMPLE VIII

1-methyl-3-[2-endomethylbicyclo-(2,2,1)-heptane-2-exocarbonyl]-urea

Ten grams of 1-methyl-3-[2-endomethylbicyclo-(2,2,1)-heptene-2-exocarbonyl]-urea in solution in 125 grams of warm alcohol was hydrogenated in the presence of palladium oxide at an initial pressure of sixty pounds of hydrogen. The catalyst was removed by filtration of the warm solution and the filtrates deposited colorless crystals on cooling which were removed by filtration and recrystallized from alcohol. The recrystallized product had a melting point of 160–161° C.

Calculated for $C_{11}H_{18}N_2O_2$:

| | Percent |
|---|---|
| Carbon | 62.83 |
| Hydrogen | 8.63 |
| Nitrogen | 13.32 |

Found:

| | |
|---|---|
| Carbon | 62.70 |
| Hydrogen | 8.61 |
| Nitrogen | 13.25 |

The active substances present in the formulations of this invention were tested for anticonvulsant activity by the method of Swinyard, Brown and Goodman, Journal of Pharmacology and Experimental Therapeutics, volume 106, page 319 (1952), for measuring their action against Metrazol-induced and electroshock-induced convulsions. The ability of the active substances to induce sleep, sleep being defined as the period during which the animal fails to assume a normal position when placed on its back, was determined by the method of P-An, Gardocki, Harfenist and Bavley, Journal of Pharmacology and Experimental Therapeutics, volume 107, page 459 (1953), the ability to induce sleep in animals being an accepted indication of hypnotic activity. The $LD_{50}$ values of the active substances were determined by oral administration to mice and calculated according to the method of Litchfield and Wilcoxon, Journal of Pharmacology and Experimental Therapeutics, volume 96, page 99 (1949). The results of the determinations of anticonvulsant activity and hypnotic activity and the calculated $LD_{50}$ values are given in the table below in which the values in column I represent the median effective dose which prevents, in fifty percent of the mice to which the substance was given orally, a tonic extensor component of the convulsion of the hind leg induced by a current strength of fifty milliamperes applied for a duration of two-tenths of a second. The values in column II represent the median effective dose required to prevent the typical convulsive seizures induced by a standard subcutaneous dose of Metrazol in fifty percent of the mice to which the substance was given orally. The values in column III represent the median effective dose which causes hypnosis in fifty percent of the mice to which the substance was given orally. The $LD_{50}$ values in column IV represent the median dose required to kill fifty percent of the mice to which the substance was given orally. All values in the table represent milligrams of substance per kilogram of body weight.

| Compound | I | II | III | IV |
|---|---|---|---|---|
| Bicyclo-(2,2,1)-5-heptene-2-endocarbonylurea | 155 | 97 | | 3,000 |
| 2-Endomethylbicyclo-(2,2,1)-5-heptene-2-exocarbonylurea | 73.5 | 33.5 | 84 | 186 |
| Bicyclo-(2,2,2)-5-octene-2-carbonylurea | 350 | 135 | 800 | about 2,000 |
| 1-Methyl-3-[2-endomethylbicyclo-(2,2,1)-5-heptene-2-exocarbonyl]-urea | about 250 | 250–500 | | |

In employing the active substances having anticonvulsant and hypnotic activity in the formulations of the present invention, one or more of the substances are uniformly distributed in a suitable vehicle which is chemically compatible with the substance or substances selected and formed into a tablet or sealed in a gelatin capsule.

Inert diluents or fillers are chosen which are chemically compatible with the substances. Satisfactory diluents include lactose, dextrose, sucrose, sodium chloride, glycine, kaolin and starch. It is desirable that a binder such as acacia, zein, tragacanth, gelatin, sodium carboxymethylcellulose, or methyl cellulose and also, in order that a tablet may be readily prepared, that a lubricant such as magnesium stearate, zinc stearate, mineral oil, stearic acid, stearyl alcohol or mono- and polyglycol esters also be intimately admixed with the fillers and active agent. The above ingredients, including the substances having anticonvulsant and hypnotic activity, may be formed into a tablet by thoroughly mixing the ingredients in a moist condition, granulating and compressing the mixture by conventional methods.

In order to disclose more clearly the nature of the present invention, several specific examples of formulations containing the substances having anticonvulsive and hypnotic activity will hereafter be described in considerable detail. It should be understood that they are presented solely for purposes of illustration and not with the object of either delineating the scope of the application or restricting the scope of the appended claims. The amount in the examples are expressed in milligrams.

EXAMPLE IX

| | |
|---|---|
| Bicyclo-(2,2,1)-5-heptene-2-endocarbonylurea | 300 |
| Dipotassium phosphate | 50 |
| Acacia | 50 |
| Magnesium stearte | 30 |
| Lactose | 70 |

EXAMPLE X

| | |
|---|---|
| 2-methylbicyclo-(2,2,2)-5-octene-2-carbonylurea | 300 |
| Dipotassium phosphate | 50 |
| Acacia | 50 |
| Magnesium stearte | 30 |
| Lactose | 70 |

EXAMPLE XI

| | |
|---|---|
| Bicyclo-2,2,2)5-octene-2-carbonylurea | 350 |
| Disodium phosphate | 50 |
| Gum tragacanth | 50 |
| Stearic acid | 35 |
| Dextrose | 75 |

EXAMPLE XII

| | |
|---|---|
| 2-endomethylbicyclo-(2,2,1)-5-heptene-2-exocarbonylurea | 350 |
| Disodium phosphate | 50 |
| Gum tragacanth | 50 |
| Stearic acid | 35 |
| Dextrose | 75 |

EXAMPLE XIII

| | |
|---|---|
| 1 - methyl - 3 - [2 - endomethylbicyclo - (2,2,1) - 5-heptene - 2 - exocarbonyl] - urea | 400 |
| Aluminum hydroxide | 45 |
| Gelatin | 55 |
| Zinc stearate | 30 |
| Sucrose | 70 |

EXAMPLE XIV

| | |
|---|---|
| 1 - acetyl - 3 - [2 - endomethylbicyclo - (2,2,1) - 5-heptene - 2 - exocarbonyl] - urea | 400 |
| Aluminum hydroxide | 45 |
| Gelatin | 55 |
| Zinc stearate | 30 |
| Sucrose | 70 |

EXAMPLE XV

| | |
|---|---|
| 1 - [2 - endomethylbicyclo - (2,2,1) - 5 - heptene - 2-exocarbonyl]-biuret | 425 |
| Dipotassium phosphate | 50 |
| Acacia | 50 |
| Stearic acid | 35 |
| Dextrose | 65 |

EXAMPLE XVI

| | |
|---|---|
| 1 - methyl - 3 - [2 - endomethylbicyclo - (2,2,1)-heptane - 2 - exocarbonyl] - urea | 425 |
| Dipotassium phosphate | 50 |
| Acacia | 50 |
| Stearic acid | 35 |
| Dextrose | 65 |

A formulation of this invention containing about one-half to about three grams of the active substance is an effective and safe dose for oral administration as an anticonvulsant to prevent epileptiform seizures.

It will be apparent to those skilled in the art that numerous variations, modifications, and extensions of the principles involved may be made without departing from the spirit and scope of the invention. Thus, for example the inert ingredients employed in the various examples are merely illustrative and it will be apparent that many others may be used in place of those illustrated in the examples. Likewise, other than those specifically mentioned in Examples IX to XVI inclusive may be used either singly or in combination. All such variations, modifications, and extensions are to be understood as included within the ambit of the appended claims.

This application is a continuation-in-part of application Serial No. 573,611, filed March 26, 1956, now abandoned.

What is claimed is:

1. Bicyclic carbon-bridged carbonylureas having the planar structural formula

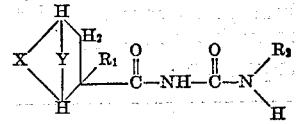

in which X is a bivalent aliphatic radical selected from the class consisting of ethylene and vinylene radicals, Y is a bivalent alkylene radical having not more than two carbon atoms, $R_1$ is selected from the class consisting of hydrogen and a lower alkyl, and $R_2$ is selected from the class consisting of hydrogen, lower alkyl, acetyl and carboxamide.

2. Bicyclo-(2,2,1)-5-heptene-2-endocarbonylurea.

3. 2-methylbicyclo-(2,2,2)-5-octene-2-carbonylurea.

4. 2 - endomethylbicyclo - (2,2,1) - 5 - heptene - 2-exocarbonylurea.

5. 1 - acetyl - 3 - [2 - endomethylbicyclo - (2,2,1) - 5-heptene-2-exocarbonyl]-urea.

6. Bicyclo-(2,2,2)-5-octene-2-carbonylurea.

References Cited in the file of this patent

UNITED STATES PATENTS

| 2,680,115 | Rudy et al. | June 1, 1954 |
| 2,789,110 | Klavehm | Apr. 16, 1957 |
| 2,807,624 | Grogan et al. | Sept. 24, 1957 |

FOREIGN PATENTS

| 620,903 | Germany | Oct. 30, 1935 |
| 734,560 | Germany | Apr. 20, 1943 |
| 230,432 | Great Britain | Oct. 8, 1925 |

OTHER REFERENCES

Spielman et al.: J.A.C.S., vol. 70, p. 4190 (1940).
Gulliana et al.: Chem. Absts., vol. 48, p. 9333 (1954).

UNITED STATES PATENT OFFICE
CERTIFICATE OF CORRECTION

Patent No. 2,942,026                        June 21, 1960

Werner R. Boehme et al.

It is hereby certified that error appears in the printed specification of the above numbered patent requiring correction and that the said Letters Patent should read as corrected below.

Column 3, line 32, first table thereof, under the heading "Percent", last line, for "13.25" read -- 13.35 --.

Signed and sealed this 27th day of December 1960.

(SEAL)
Attest:

KARL H. AXLINE                              ROBERT C. WATSON
Attesting Officer                             Commissioner of Patents